Sept. 15, 1964 A. RONZANI 3,148,673
APPARATUS FOR CUTTING MARBLE BLOCKS INTO SLABS
Filed May 14, 1962 2 Sheets-Sheet 1

INVENTOR
ANGELO RONZANI
BY
ATTORNEY.

Sept. 15, 1964   A. RONZANI   3,148,673
APPARATUS FOR CUTTING MARBLE BLOCKS INTO SLABS
Filed May 14, 1962   2 Sheets-Sheet 2
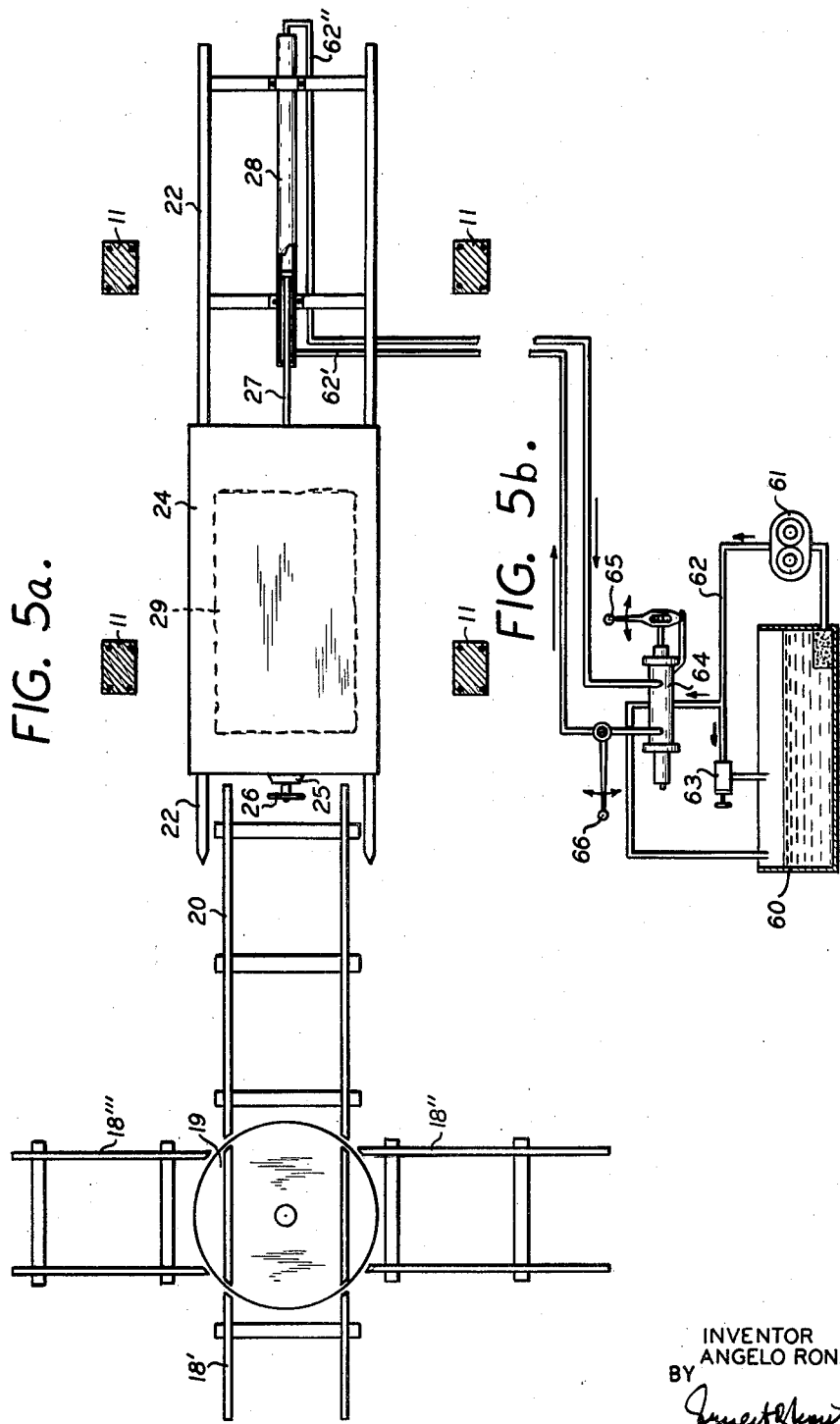
INVENTOR
ANGELO RONZANI
BY
ATTORNEY.

United States Patent Office

3,148,673
Patented Sept. 15, 1964

3,148,673
APPARATUS FOR CUTTING MARBLE
BLOCKS INTO SLABS
Angelo Ronzani, Levico, Italy, assignor to S.p.A.
Secoblitz-Industria Meccanica, Levico (Trento),
Italy
Filed May 14, 1962, Ser. No. 194,632
4 Claims. (Cl. 125—13)

The present invention relates to an apparatus for cutting marble blocks into slabs.

Multiple machine saws for quarried marble blocks have been used before for working only squared blocks reduced as much as possible, to form prismatic rectangular shapes.

However, the process which has been known up to now eliminates the possibility of treating blocks which have not been reduced to regular shapes and, consequently, quarried blocks must be squared before sawing, which involves considerable loss of time and labor, the costs of which greatly increase the overall cost.

It is one object of the present invention to provide an apparatus for cutting marble blocks and permitting the sawing into slabs of blocks coming directly from the quarry with a minimum cost of production.

Basically such a machine permits of the following technical advantages:

(1) A total automation of the operations necessary for putting the marble block into position;

(2) A cutting by longitudinal displacement along the cutting plane of the operating tool with automatic advancement of the treated block;

(3) A pre-arrangement of several trucks on shunt tracks or on the track feeding the machine.

It is another object of the present invention to provide a machine saw having milling discs for cutting marble blocks into slabs, which machine or apparatus comprises a frame carrying a bridge beam, normally displaceable under the cutting action of the milling disc for displacements operated periodically by special members determining the thickness of the slabs to be cut and wherein a casing formed in the beam is in turn capable of vertical displacement by hand or by motor, a unit operating the milling disc or discs, located in the casing formed in the bridge beam, a group of members for lateral displacement of the bridge beam, operable manually or controlled by a motor, a group of controls for a block-carrying truck for forward motion during the work and a rapid return, and guides for the support and movement of the block-carrying truck during the working phase with an assembly of truck rails for loading the blocks and an appropriate platform for hooking up and shunting.

With these and other objects in view, which will become apparent in the following detailed description, the present invention will be clearly understood in connection with the accompanying drawings, in which:

FIG. 5a is a diagrammatic view of the system used for moving the block-carrying trucks; and FIG. 5b is an elevation of the control unit which moves the trucks backwards and forwards during the course of the operation.

Figure 2:
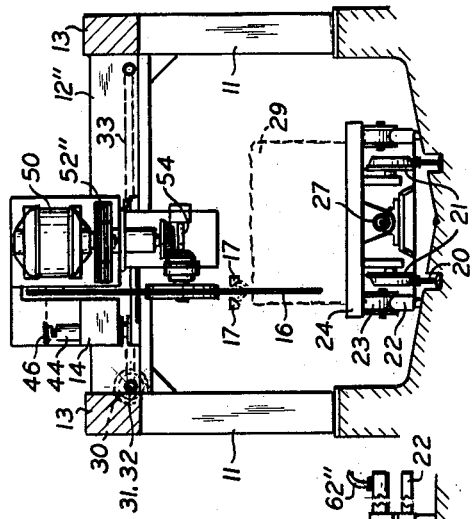
FIG. 2 is a section along the lines K—K of FIG. 1.
Figure 4:
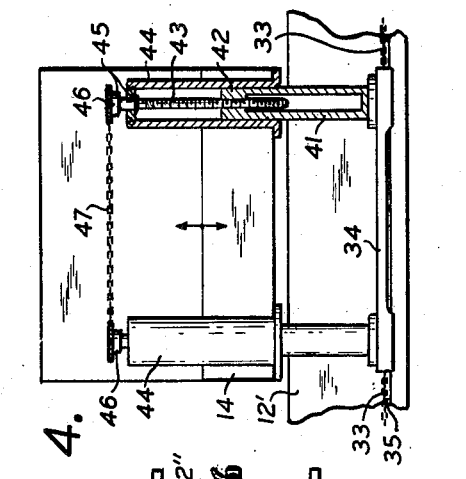
FIG. 4 is a fragmentary view of the apparatus disclosed in FIG. 1.
Figure 3:
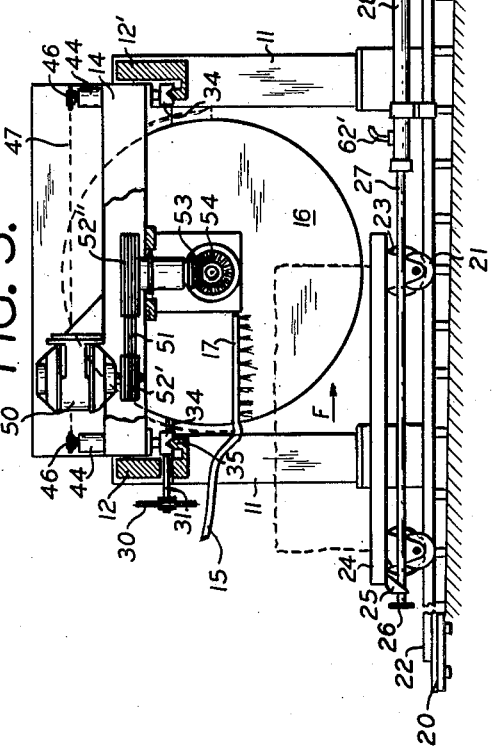
FIG. 3 is an axial section along the lines Y—Y of FIG. 1.
Figure 1:
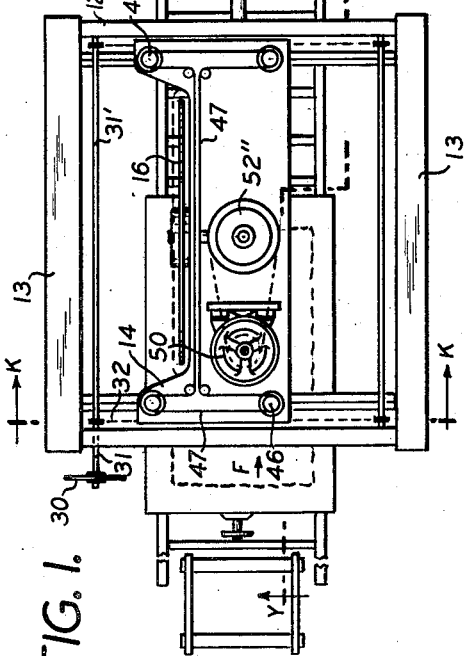
FIGURE 1 is a top plan view of the apparatus designed in accordance with the present invention.

Referring now to the drawings, and in particular to FIGS. 1 to 4, the apparatus comprises substantially a strong frame 11, 12, 12′, 13 and 14 for driving members and members transmitting the drive to an operating tool 16.

An automatically advancing and returning truck 21, 25, 24 can also run over shunt tracks 20.

Other accessory apparatus and devices which are described below form part of the apparatus or machine saw. A hollow bridge beam 14 rests on intermediate slide guides 34 (FIGS. 2 and 3) disposed on the front end cross member 12′, and the rear end cross member 12 and is the seat of the assembly of driving members and the members transmitting the drive to the operating tool in the form of a milling disc 16.

The bridge beam 14 is displaced by an operating unit and the displacements thereof serve to determine the section to be cut out on a block 29. It will be noted in particular that the bridge beam 14 is provided with a unit for subjecting the entire operating members of the cutting implement, and also the latter with respect to the slide 34 and, therefore, with respect to the guide 35 rigidly connected to the cross members 12 and 12′, for vertical displacement in order to set the implement or milling disc 16 into its operative position.

Furthermore, the apparatus includes a unit operating the block-carrying truck connected to a rod 27 of a pump fed by an oil-powered system, shown in detail in FIG. 5b.

The individual means which form together the machine saw, are substantially constituted and formed in the following manner:

The frame of the machine is formed of four vertical uprights 11, the upper ends of which are connected by a square framework consisting of the cross members 12 and 12′ and the longitudinal beams 13.

The group for operating the lateral displacement of the bridge beam, housed in a casing and operated by a motor 50, drives by means of transmission members 51, 52′ and 52″, a pair of bevel gears 53 rotating a driving shaft 54 of the cutting disc 16. The entire assembly, as already mentioned, can be displaced with respect to its own supporting slides 34, since fixed thereto are four guide cylinders 41 (FIG. 4), the upper end 42 of which has inner threads to receive screw bolts 43 in turn connected at their upper ends to guides 45 fixed to the upper ends of cylinders 44 which can thus be displaced, and gently guided vertically by the cylinders 44.

Thus the ends of the screw bolts 43 are rigidly connected to sprockets 46 having teeth meshing with an endless chain 47. Therefore, as is clearly shown in FIG. 1, since the sprockets 46 of each pair of cylinders are connected by the same chain, a displacement thereof effects all the sprockets 46 which simultaneously operate all the screw bolts 43 with respect to their own seating 42. Such an operation, as it causes the entire bridge beam to be raised or lowered with respect to the members 41–54 and, therefore, also relatively to the cross members 12 and 12′, forces the connection of the bridge beam with the appropriate group operated by the cutting tool 16.

In order to move the cutting disc into its correct operating position, the lateral displacements are effected by means of a hand wheel 30 disposed on the top of the apparatus and carefully fitted on the front end cross member 12. Such a hand wheel 30, connected to a shaft 31 with a sprocket 32 meshes with a roller chain 33 having its ends fixed to the slide 34 connected to the cylinders of the unit raising the bridge beam.

The slide 34 rests at each end on guides 35 forming part of the top cross members 12 and 12′. Suitable friction gears 51 and a roller chain 35′ cause the displacements on the front of the moving bridge beam simultaneously with those on the rear thereof.

In particular, the truck carrying the marble block 29 to be cut is provided with a double system of pairs of bearing wheels 21 and 23. The pairs of wheels 23 rest with their bearing surfaces on guides 22, while the pairs of wheels 21 rest on the supporting surface of Decauville chain rails 20.

The control unit for the displacement of the truck 21, 23, 24 (FIG. 5a) is brought into operation, whenever the truck has been brought to the working position by one of the loading arms 18′, 18″ and 18‴, that is to any, when the pairs of bearing wheels 23 rest on the surface of the guides 22 and the pairs of wheels 21 have left the bearing surface of the shunt chain rails 20 and approach the truck. The arms 18′, 18″ and 18‴, served from a platform 19, are used to shunt the various trucks which, during the period necessary for the work of sawing one block are loaded with other blocks to be sawn. In this manner the blocks can be dealt with one after another without loss of time due to long wasted intervals.

When the truck with the appropriate block is located below the frames 11 to 14 of the apparatus, it is hooked by a screw connection 26 to a piston rod 27 of a piston reciprocating in a cylinder 28. The respective ends of the cylinder 28 communicate with conduits, namely a conduit 62′, for a slow cutting stroke, and a conduit 62″ for a rapid return stroke.

The conduits 62′ and 62″ communicate with a system disclosed in FIG. 5b, consisting of a supply tank 60 from which a pump 61 is fed with fluid which flows through a conduit 62 having an outlet valve 63 for a return to the tank 60, or to the double-acting distributor 64. The operation of the latter is controlled by an operating lever 65 which connects the pump 61 either with the conduit 62′ or with the conduit 62″. However, a lever 66 controls a throttle valve which in turn controls the flow through the conduit 62′ to the cylinder 28 during the sawing operation and performs in such manner as not to exceed a certain operating force similar to the power of the motor 50 and hence the power required for the operating surface of the milling disc 16 and the degree of compactness of the block 29.

The return of the stated connecting position of the surface of the milling disc 16 to the block 29 is effected by feeding the cylinder 28 for a fast stroke from the conduit 62′. A hydraulic conduit 15 leads to a second conduit 17 having perforations for feeding washing water used during the cutting operation.

In the course of the present description, the operations for the vertical or lateral displacement of the bridge beam are indicated by a specific means, yet, under the control of suitable impulse switches, the use of electric motors or of a hydraulic apparatus can be provided.

While I have disclosed one embodiment of the present invention, it is to be understood that this embodiment is given by example only and not in a limiting sense, the scope of the present invention being determined by the objects and the claims.

I claim:
1. An apparatus for cutting marble blocks into slabs, comprising
four substantially vertical uprights,
front and rear cross beams supported by said uprights,
bridge beams mounted on said uprights and extending from the front to the rear,
means for displacing said bridge beams parallel to itself along said cross beams,
means for lifting and lowering, respectively, said bridge beams relative to said cross beams,
a milling disc including an electric motor operatively connected thereto supported by and displaceable along said bridge beams,
a truck carrying a marble block and rollable below said milling disc, so that upon setting said marble block in a predetermined position, said milling disc is set to a required position by lifting and lowering, respectively, said bridge beam and by moving said milling disc along said bridge beam.

2. The apparatus, as set forth in claim 1, wherein said means for displacing said bridge beams comprises slide guides mounted on said cross beams and permitting relative sliding movement.

3. The apparatus, as set forth in claim 1, wherein said truck has a first set of wheels and a second set of wheels, one of said sets running on a level higher than the other of said sets,
a first set of rails supporting said first set of wheels,
a second set of rails supporting said second set of wheels, and
said first set of wheels is adapted to move said truck during the milling operation, and
said second set of wheels is adapted to move said truck from a storing position into said apparatus to its operative position.

4. The apparatus, as set forth in claim 3, which includes
an operating rod connected with said truck, and
fluid pressure means for reciprocating said rod and, thereby, said truck.

References Cited in the file of this patent
UNITED STATES PATENTS

| | | |
|---|---|---|
| 555,611 | Mills | Mar. 3, 1896 |
| 784,561 | Grice | Mar. 14, 1905 |
| 1,097,034 | Lautz | May 19, 1914 |
| 1,607,641 | Pitkin | Nov. 23, 1926 |
| 1,683,298 | Pitkin | Sept. 4, 1928 |
| 1,765,890 | Vates | June 24, 1930 |
| 2,254,046 | Pearson | Aug. 26, 1941 |
| 2,291,058 | Pohl | July 28, 1942 |
| 2,486,765 | Snyder | Nov. 1, 1949 |
| 2,747,565 | Henderson | May 29, 1956 |